United States Patent [19]
Penzotti et al.

[11] Patent Number: 5,201,379
[45] Date of Patent: Apr. 13, 1993

[54] FLAT-FLOOR HIGH ROOF CAB-OVER-ENGINE TRACTOR

[75] Inventors: Roger P. Penzotti, Mount Vernon; James W. Saunders, Burlington, both of Wash.

[73] Assignee: Paccar Inc., Kent, Wash.

[21] Appl. No.: 712,197

[22] Filed: Jun. 7, 1991

[51] Int. Cl.⁵ .............................................. B62D 33/06
[52] U.S. Cl. ................................. 180/89.18; 296/190
[58] Field of Search ................... 180/53.8, 89.1, 89.18; 296/190

[56] References Cited

U.S. PATENT DOCUMENTS

| | | | |
|---|---|---|---|
| 2,131,083 | 9/1938 | Winn | 280/685 |
| 2,291,626 | 8/1942 | Huber | 180/14.1 |
| 2,416,478 | 2/1947 | Harbers | 180/6.2 |
| 2,700,428 | 1/1955 | Nallinger | 180/89.19 |
| 2,820,523 | 1/1958 | Earl | 180/292 |
| 3,011,581 | 12/1961 | Wood | 180/89.18 |
| 3,125,179 | 3/1964 | Müller | 180/89.18 |
| 3,339,967 | 9/1967 | Harris | 296/190 |
| 3,360,295 | 12/1967 | Reynolds | 296/190 |
| 3,411,600 | 11/1968 | Loving et al. | 180/14.1 |
| 3,451,571 | 6/1969 | Brisson | 414/499 |
| 3,588,168 | 6/1971 | Froitzheim et al. | 296/190 |
| 3,612,599 | 10/1971 | Sternberg | 296/24.1 |
| 3,711,146 | 1/1973 | Madzsar et al. | 296/180.2 |
| 3,878,914 | 4/1975 | Gülich et al. | 180/89.19 |
| 4,201,415 | 5/1980 | Suchanek | 180/89.1 |
| 4,377,841 | 3/1983 | Kukla | 180/53.8 |
| 4,650,242 | 3/1987 | Obe et al. | 296/190 |
| 4,840,423 | 6/1989 | Maekawa | 296/194 |
| 4,932,716 | 6/1990 | Marlowe et al. | 296/180.2 |

FOREIGN PATENT DOCUMENTS

| | | | |
|---|---|---|---|
| 748438 | 1/1945 | Fed. Rep. of Germany | 180/89.19 |
| 1036660 | 8/1958 | Fed. Rep. of Germany | 180/89.19 |

*Primary Examiner*—Kenneth R. Rice
*Attorney, Agent, or Firm*—Seed and Berry

[57] ABSTRACT

An improved cab for a cab-over-engine configured tractor has a driver's seat mounted to a floor of the cab wherein the floor is substantially flat. The tractor includes a frame for supporting the cab. An engine is mounted to the frame substantially beneath the cab, yet rearward of the floor so that the floor may be substantially flat. Auxiliary devices such as the radiator, radiator fan, and alternator are mounted to the frame remote from the engine and powered by a drive train that extends from the auxiliary devices to the engine.

15 Claims, 2 Drawing Sheets

FLAT-FLOOR HIGH ROOF CAB-OVER-ENGINE TRACTOR

TECHNICAL FIELD

The present invention is directed toward a cab-over-engine tractor and, more particularly, toward a cab-over-engine tractor having a substantially flat floor and a roof of sufficient height to enable a driver of the tractor to stand upright on the flat floor.

BACKGROUND OF THE INVENTION

Generally, tractors for hauling trailers are provided in two basic configurations, i.e., a conventional configuration and a cab-over-engine (COE) configuration. The conventional configuration for tractors have the cab located directly behind the engine in a typical automotive fashion. The cab-over-engine configuration provides the cab compartment directly over the engine. The cab-over-engine configuration is popular with operators who haul very long trailers and desire the improved maneuverability that can be achieved with the shorter wheelbase of the cab-over-engine configuration. This configuration is also popular with operators who must operate in jurisdictions having overal tractor-trailer length limits that can only be met with the cab-over-engine configuration.

In both configurations, the cab compartment may include a passenger seat, a driver seat, and a sleeping bunk, wherein the sleeping bunk is located rearward of the driver and passenger seats. In conventional models, the sleeping compartment is normally a separate structure located behind the cab compartment. In cab-over-engine configurations, the sleeping bunk is integral with the cab compartment and is located directly rearward of the driver and passenger seats. In both configurations, it is desirable to provide a cab compartment that maximizes the riding and sleeping comfort of the driver. To this end, it is desirable to provide a flat floor in the cab compartment to enable the driver to stand upright.

Due to a steadily increasing interest in aerodynamic efficiency, roof-mounted aerodynamic devices, referred to as aerodynamic fairings, have been developed to allow smooth flow of air over and around the trailer. Most manufacturers provide aerodynamic fairings that are an integral part of the cab and sleeping compartments. The aerodynamic fairings typically increase the overall interior and exterior height of the cab and sleeping compartments thereby providing an increase in interior headroom. While the increase in headroom is sufficient to permit a driver to stand upright in conventional models, the location of the engine directly beneath the cab compartment of the cab-over-engine configuration results in an engine tunnel intermediate the driver and passenger seats of the cab compartment. Movement of the driver from the driver seat to the passenger seat in an upright position is prohibited by the engine tunnel. Accordingly, it is desirable to provide a tractor having a cab-over-engine configuration wherein the cab compartment has a flat floor so that an unobstructed pathway is provided between the driver and passenger seats of the cab compartment in addition to providing an unobstructed pathway between the driver and passenger seats and the sleeping bunk.

One prior art method for providing a cab compartment of a cab-over-engine configured tractor wherein the cab compartment has a flat floor and sufficient stand up headroom to provide an unobstructed pathway between the driver and passenger seats of the cab compartment is to simply increase the height of the cab until the floor line clears the top of the engine. Unfortunately, this results in an extremely tall tractor having numerous disadvantages. The overall size and weight of the tractor increases significantly thereby providing a fuel economy penalty when pulling trailers having a smaller aerodynamic cross-section than the tractor. Also, the added height makes cab ingress and egress more difficult and deteriorates ride quality. An additional difficulty is that the tractor can no longer be towed or decked for transport without exceeding legal height limits, a difficulty that is worsened by the additional exterior height resulting from the aerodynamic fairing.

Another prior art method for providing a flat floor in a cab-over-engine configured tractor is to provide a so-called "pancake" engine where the normal in-line engine is laid over on its side and is located low in the frame. The engine is turned around so that the transmission is forward. An output shaft runs alongside the engine and is driven by a reversing gear. The output shaft is coupled to an intermediate bearing that drives a second shaft which in turn drives the rear axle. This configuration is mechanically complex and for this reason not acceptable. The combination of the reversing gear and additional shaft reduces the overall fuel economy of the engine. Also, due to the added number and complexity of the devices in the drive train, the cost of repairs and frequency of necessary maintenance is increased. Accordingly, it is desirable to provide a cab-over-engine tractor having a flat floor and sufficient height in the cab compartment to enable a driver to stand upright without unnecessarily increasing the mechanical complexity of the engine drive train.

SUMMARY OF THE INVENTION

The present invention provides a tractor for a truck wherein the tractor is constructed for operation by a driver. The tractor includes a cab for providing a riding compartment for the driver of the tractor. The cab includes a seat mounted to a flat floor of the cab for seating the driver of the tractor. The cab has a forward portion and a rearward portion. The tractor also includes a frame having a front end and a rear end. The cab is supported on the frame proximate the front end thereof. The tractor further includes an engine for providing a drive force to the frame. The engine is mounted to the frame rearward of the floor of the cab compartment so that the floor may be substantially flat, providing an unobstructed pathway from the driver seat to the passenger seat of the cab in addition to providing an unobstructed pathway between the seat and the rearward portion of the cab.

In an alternate embodiment of the invention, a radiator, an alternator, and a fan are each mounted to the front end of the frame remote from the engine. A drive shaft extends from the front end of the frame to the engine for transferring rotational energy from the engine to the fan and the alternator.

DETAILED DESCRIPTION OF THE INVENTION

Figure 1:
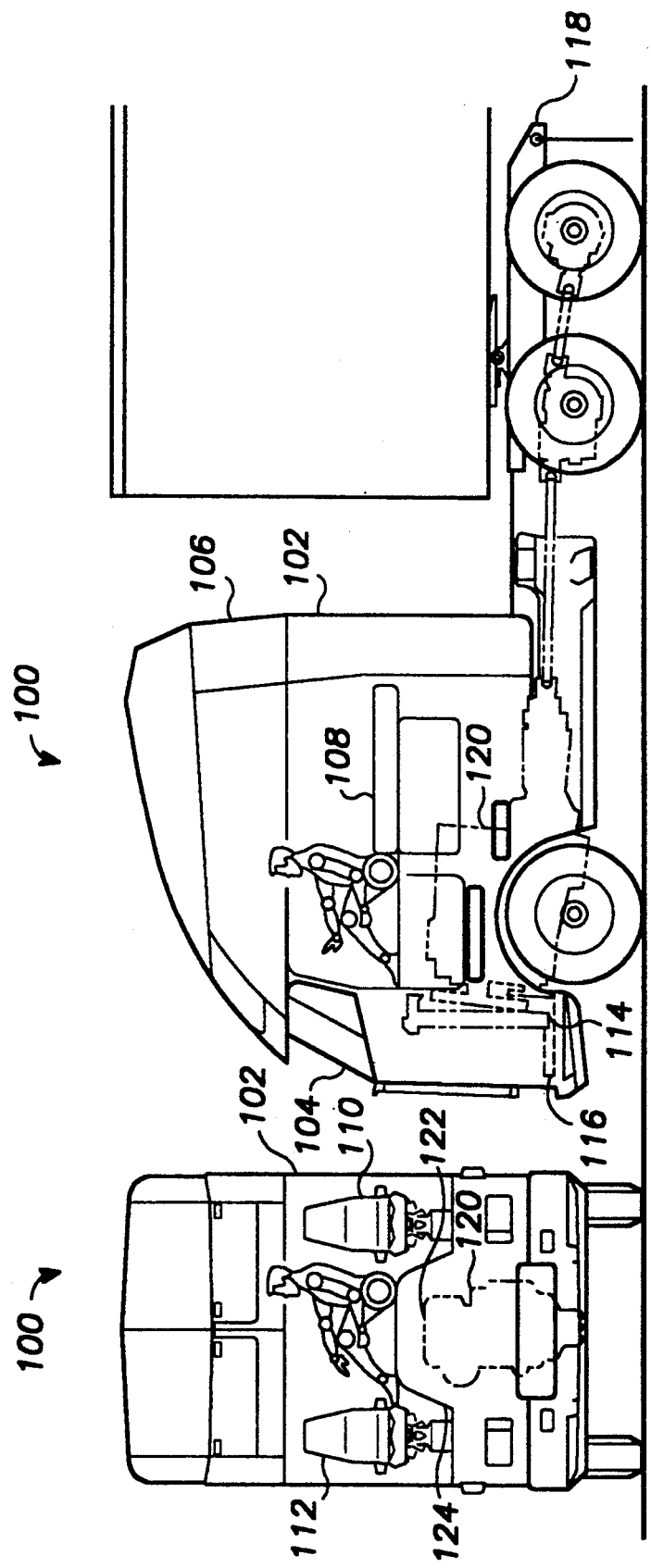
FIG. 1 is an illustrative diagram of a typical cab-over-engine configured tractor having an engine tunnel intermediate the driver and passenger seats of the tractor.

A conventional configuration for a cab-over-engine tractor is illustrated in FIG. 1. Therein, a tractor 100 includes a cab compartment 102 for providing a riding compartment for the driver of the tractor 100. The cab compartment includes a forward end 104 and a rearward end 106 and has a bunk 108 mounted to the rearward end 106. The cab also includes a driver seat 110 and a passenger seat 112. The tractor 100 has a frame 114 having a front end 116 and a rear end 118. An engine 120 is mounted to the front end of the frame beneath the cab compartment so that the top portion 122 of the engine extends upward intermediate the driver seat 110 and the passenger seat 112 thereby requiring an engine tunnel 124 in the floor of the cab 102. As illustrated in FIG. 1, the engine tunnel obstructs the pathway intermediate the driver seat 110 and the passenger seat 112, thereby preventing the driver from standing upright in this portion of the cab compartment 102.

Figure 2:
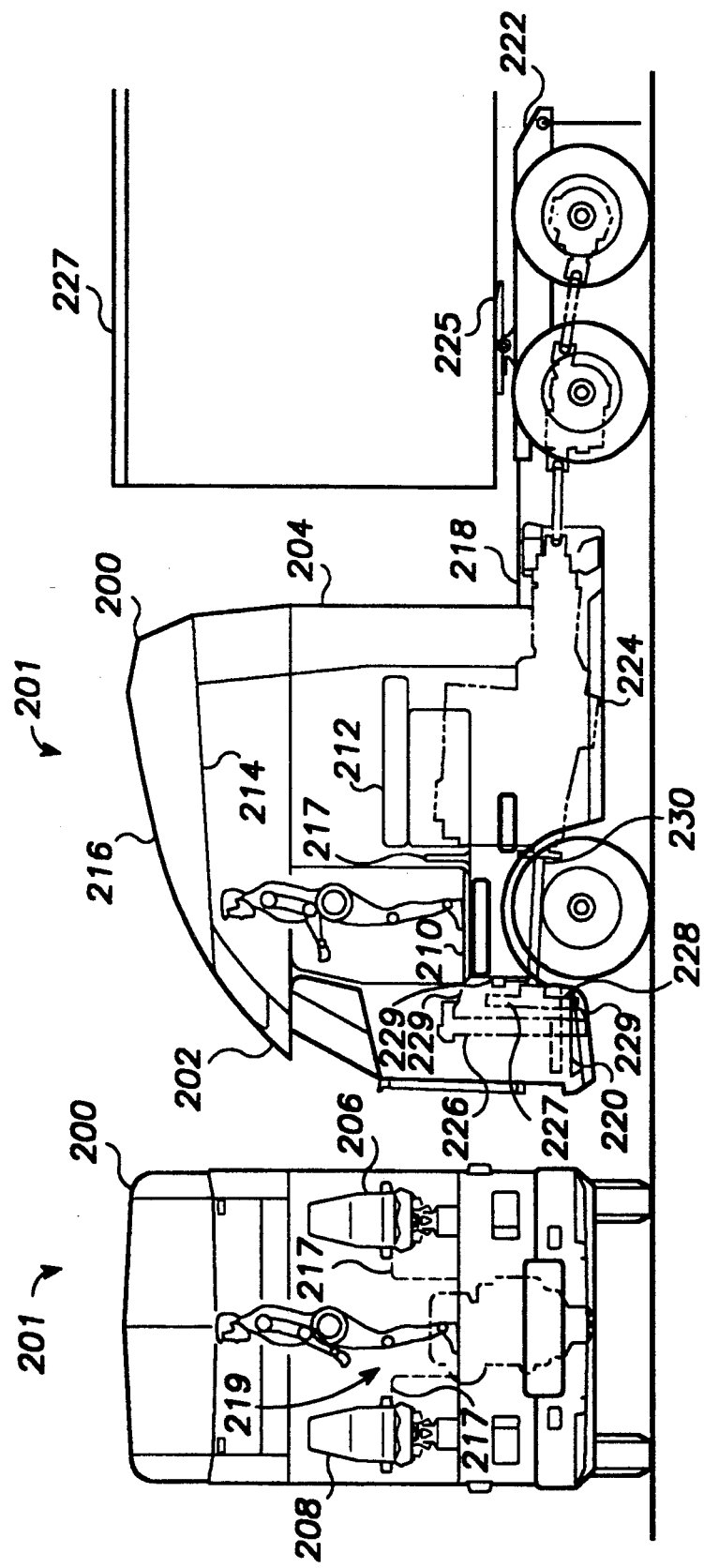
FIG. 2 is an illustrative diagram of the cab-over-engine tractor having a cab compartment with a substantially flat floor.

An improved design for a cab-over-engine tractor is illustrated in FIG. 2. Therein a tractor 201 includes a cab compartment 200 having a forward portion 202 and a rearward portion 204. The cab compartment 200 includes a driver seat 206 and a passenger seat 208 mounted to a substantially flat floor 210 of the cab. A sleeping bunk 212 is mounted to the rearward portion 204 of the cab. The cab 200 further includes a ceiling 214 having sufficient height to enable the driver of the cab to stand upright on the floor 210. An aerodynamic fairing 216 is mounted to the roof 214 of the cab to provide improved aerodynamic performance of the cab. The aerodynamic fairing 216 may be removed from the roof 214 so that the tractor 201 may be towed or decked without exceeding legal height limits. A bulkhead 217 is positioned intermediate the rearward portion 204 and the forward portion 202. The bulkhead includes a throughway 219 that permits the driver to pass between the forward portion and the rearward portion.

It will be apparent to those skilled in the art, that many seating and sleeping configurations may be provided without departing from the scope of the present invention. As an example, the driver seat and passenger seat may comprise an integral structure extending the entire width of the cab compartment 200. Alternatively, the bulkhead 217 may comprise an uninterrupted structure completely separating the rearward portion 204 and the forward portion 202 with a separate entrance being provided to the sleeping compartment as with conventionally configured tractors. Many other possibilities for seating and sleeping configurations will readily become apparent to those skilled in the art.

The tractor 201, also includes a frame 218 having a front end 220 and a rear end 222. The cab compartment 200 is supported by the frame 218 and is positioned proximate the front end 220. An engine 224 is mounted to the frame 218, substantially under the cab compartment 200, yet rearward of the flat floor 210, so that no engine tunnel need be provided. In this manner a substantially unobstructed pathway is provided intermediate the driver seat 206 and the passenger seat 208 of the cab compartment 200. The engine 224 may comprise any standard prime mover for a conventional cab-over-engine configured tractor. The frame 218 further includes a fifth wheel 225 for coupling a trailer 277, to the tractor 201, as is known in the art.

A radiator 226 is mounted to the front end 220 of the frame 218 for transferring heat from a liquid coolant to air surrounding the radiator 226. A fan 228 is also mounted to the front end 220 proximate the radiator 226. A drive shaft 230 extends from the engine 224 to the front end 220 of the frame 218. The drive shaft 230 is provided for transferring rotational energy from the engine 224 to the fan 228 for rotating the fan 228. The fan 228 creates air flow through the radiator 226, thereby to improve the heat transfer of the radiator. An alternator 232 is also mounted to the front end 220 of the frame and coupled to the drive shaft 230 for receiving rotational energy supplied by the drive shaft 230. The alternator is provided for converting the rotational energy of the drive shaft 230 to electrical energy.

Other auxiliary devices of the engine, such as an air conditioner compressor, battery, solenoids, etc., may be mounted to the front end of the frame, remote from the engine, in the same manner as the radiator 226, fan 228, and alternator 232. As a result of mounting these devices to the frame, remote from the engine, these devices are provided with less vibration than would exist if mounted to the engine. As a result, greater efficiency may be achieved in the operational features of these devices with less repairs being required. As an example, the tips of the blades 227 of the fan 228 may be positioned closer to the fan shroud 229 than is permitted in the conventional design of FIG. 1 since there will be less relative movement between the fan 228 and the fan shroud 229 in the improved embodiment of FIG. 2 than in the embodiment of FIG. 1. Accordingly, less clearance is required intermediate the fan and the fan shroud, thereby improving the cooling efficiency of the radiator 226.

It will be appreciated that, although specific embodiments of the invention have been described herein for purposes of illustration, various modifications may be made without departing from the true spirit and scope of the invention. Accordingly, the invention is not limited except as by the appended claims.

What is claimed is:

1. A tractor for a truck wherein the tractor is constructed for operation by a driver and wherein the tractor is constructed for hauling a trailer, said tractor comprising:

a cab compartment for the driver of the truck, said cab compartment including a driver seat and a passenger seat mounted to a floor of said cab compartment, said floor being substantially flat to provide a substantially unobstructed pathway between said driver seat and said passenger seat, said driver seat being positioned so that when the driver is seated therein the driver faces toward a forward portion of said cab compartment and away from a rearward portion of said cab compartment, said cab compartment including a sleeper bunk mounted to said rearward portion thereof, a bulkhead positioned intermediate said forward and rearward portions of said cab compartment, and a throughway to permit the driver to enter said rearward portion from said forward portion, said cab compartment further including a roof on the top thereof constructed for providing sufficient height interior of said cab compartment to enable the driver to stand upright on said floor;

frame means for supporting said cab compartment, said frame means having a front end and a rear end, said cab compartment being supported proximate said front end of said frame means, said frame means including means for releasably coupling the trailer thereto;

engine means for providing a drive force to the tractor, said engine means being mounted to said frame means and positioned substantially beneath said cab compartment rearward of said floor so that said floor may be positioned lower than the top of said engine means and may be substantially flat;

radiator means for transferring heat from a liquid coolant to air outside said radiator means, said radiator means being mounted to said front end of said frame means, said radiator means including means for conducting said liquid coolant to said engine means for cooling said engine means;

a fan mounted to said front end of said frame means, said fan being mounted proximate said radiator means to create air flow through said radiator means thereby to improve the transfer of heat from said radiator means to air outside said radiator means;

drive shaft means for providing rotational drive movement to said fan, said drive shaft means being positioned substantially beneath said floor and extending from said front end of said frame means to said engine means, said drive shaft means being coupled to said engine means to be rotated by said engine means;

alternator means for generating electrical energy, said alternator means being mounted to said front end of said frame means remote from said engine means, said alternator means being coupled to said drive shaft means for converting rotational energy provided by said drive shaft means to electrical energy; and an aerodynamic fairing mounted to said roof of said cab compartment.

2. A tractor for a truck wherein the tractor is constructed for operation by a driver and wherein the tractor is constructed for hauling a trailer, said tractor comprising:

a cab compartment for the driver of the truck, said cab compartment including a driver seat and a passenger seat mounted to a floor of said cab compartment, said floor being substantially flat to provide a substantially unobstructed pathway between said driver seat and said passenger seat, said driver seat being positioned so that when the driver is seated therein the driver faces toward a forward portion of said cab compartment and away from a rearward portion of said cab compartment, said cab compartment including a sleeper bunk mounted to said rearward portion thereof;

frame means for supporting said cab compartment, said frame means having a front end, a rear end, and a longitudinal axis extending from said front end to said rear end said cab compartment being supported proximate said front end of said frame means, said frame means including means for releasably coupling the trailer thereto; and engine means for providing a drive force to the tractor, said engine means having a longitudinal axis and being mounted to said frame means so that its longitudinal axis is substantially parallel to the longitudinal axis of said frame means and so that said engine means is positioned substantially beneath said cab compartment rearward of said floor.

3. The tractor as recited in claim 2 wherein said cab compartment further comprises a bulkhead positioned intermediate said forward and rearward portions of said cab compartment and including a throughway to permit the driver to enter said rearward portion from said forward portion.

4. The tractor as recited in claim 2 wherein said cab compartment further comprises a roof on the top thereof constructed for providing sufficient height interior of said cab compartment to enable the driver to stand upright on said floor.

5. The tractor as recited in claim 4 further comprising aerodynamic fairing means mounted to said roof of said cab compartment for providing aerodynamic efficiency to said tractor.

6. The tractor as recited in claim 2 further comprising:

radiator means mounted to said front end of said frame means remote from said engine means for transferring heat from a liquid coolant to air outside said radiator means;

a fan mounted to said front end of said frame means proximate said radiator means for creating air flow through said radiator means to improve the transfer of heat said liquid coolant to the air outside said radiator means; and drive shaft means for providing rotational energy to said fan means, said drive shaft means extending from said front end of said frame means to said engine means for transferring rotational energy from said engine means to said fan.

7. The tractor as recited in claim 2 further comprising:

alternator means for generating electrical energy, said alternator means being mounted to said front end of said frame means remote from said engine means; and drive shaft means for providing rotational energy to said alternator means, said drive shaft means extending from said front end of said frame means to said engine means for transferring rotational energy from said engine means to said alternator means.

8. The tractor as recited in claim 6 further comprising alternator means for generating electrical energy, said alternator means being mounted to said front end of said frame means remote from said engine means, said alternator means being coupled to said drive shaft means for converting rotational energy provided by said drive shaft means to electrical energy.

9. A tractor for a truck wherein the tractor is constructed for operation by a driver to haul a trailer, said tractor comprising:

cab means for providing a riding compartment for the driver of the tractor, said cab means including seat means mounted to a floor of said cab means for seating the driver of the tractor, said cab means having a forward portion and a rearward portion, said cab means including a sleeping bunk mounted to said rearward portion;

frame means for supporting said cab means, said frame means having a front end and a rear end, said cab means being supported proximate said front end of said frame means, said frame means including coupling means for releasably coupling the trailer to said frame means; and engine means for providing a drive force to said frame means, said engine means having a longitudinal axis and being mounted to said frame means rearward of said floor of said cab compartment so that said longitudinal axis extends parallel an axis defined from said front end of said frame means to said rear end thereof and so that said floor is substantially flat.

10. The tractor as recited in claim 9 further comprising:

radiator means mounted to said front end of said frame means remote from said engine means for transferring heat from a liquid coolant to air outside said radiator means;

a fan mounted to said front end of said frame means proximate said radiator means for creating air flow through said radiator means to improve the transfer of heat from said liquid coolant to the air outside said radiator means; and drive shaft means for providing rotational energy to said fan, said drive shaft means extending from said front end of said frame means to said engine means for transferring rotational energy from said engine means to said fan.

11. The tractor as recited in claim 10 further comprising alternator means for generating electrical energy, said alternator means being mounted to said front end of said frame means remote from said engine means, said alternator means being coupled to said drive shaft means for converting rotational energy provided by said drive shaft means to electrical energy.

12. The tractor as recited in claim 11 wherein said cab means further comprises a roof having sufficient height to enable the driver of the tractor to stand upright on said floor of said cab means.

13. The tractor as recited in claim 12 wherein said seat means comprises a driver seat and a passenger seat.

14. The tractor as recited in claim 13 wherein said cab means further comprises a sleeping bunk mounted to the rearward portion of said cab means.

15. The tractor as recited in claim 13 further comprising a bulkhead positioned intermediate said forward portion and said rearward portion of said cab means, said bulkhead including a throughway to enable the driver to enter said rearward portion from said forward portion.

* * * * *

UNITED STATES PATENT AND TRADEMARK OFFICE
CERTIFICATE OF CORRECTION

PATENT NO. :   5,201,379

DATED      :   April 13, 1993

INVENTOR(S) :  Roger P. Penzotti and James W. Saunders

It is certified that error appears in the above-identified patent and that said Letters Patent is hereby corrected as shown below:

In column five, claim two, line 60, after "rear end" and before "said cab", please insert --,--.

In column six, claim six, line 27, after "of heat" and before "said liquid", please insert --from--.

Signed and Sealed this

Fourth Day of January, 1994

BRUCE LEHMAN

*Attest:*

*Attesting Officer*    Commissioner of Patents and Trademarks